(12) United States Patent
Kono

(10) Patent No.: US 7,201,378 B2
(45) Date of Patent: Apr. 10, 2007

(54) STRIP BRUSH SEAL

(75) Inventor: Toru Kono, Saitama (JP)

(73) Assignees: Eagle Engineering Aerospace Co., Ltd., Tokyo (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/852,263

(22) Filed: May 25, 2004

(65) Prior Publication Data
US 2007/0018408 A1 Jan. 25, 2007

(30) Foreign Application Priority Data
May 30, 2003 (JP) ............... 2003-153810

(51) Int. Cl.
*F01D 11/02* (2006.01)
(52) U.S. Cl. ..................................... 277/355
(58) Field of Classification Search ............ 277/355, 277/415; 415/174.2, 174.5
See application file for complete search history.

(56) References Cited

U.S. PATENT DOCUMENTS

| 5,941,685 | A * | 8/1999 | Bagepalli et al. ...... 415/173.3 |
| 6,267,381 | B1 * | 7/2001 | Wright ..................... 277/355 |
| 6,308,957 | B1 * | 10/2001 | Wright ..................... 277/355 |
| 6,343,792 | B1 * | 2/2002 | Shinohara et al. ......... 277/355 |
| 6,601,853 | B2 * | 8/2003 | Inoue ......................... 277/355 |
| 6,648,334 | B2 * | 11/2003 | Inoue ......................... 277/355 |
| 6,874,788 | B2 * | 4/2005 | Kono ......................... 277/355 |
| 2002/0140175 | A1 * | 10/2002 | Kono ......................... 277/355 |
| 2003/0042682 | A1 * | 3/2003 | Inoue ......................... 277/355 |
| 2003/0062684 | A1 * | 4/2003 | Inoue ......................... 277/355 |

FOREIGN PATENT DOCUMENTS

| EP | 0 629 798 A1 | 12/1994 |
| EP | 0 933 567 A2 | 8/1999 |
| EP | 1 013 975 A1 | 6/2000 |
| FR | 2 715 983 A1 | 8/1995 |
| GB | 2 286 434 A | 8/1995 |

* cited by examiner

*Primary Examiner*—William L. Miller
(74) *Attorney, Agent, or Firm*—Arent Fox LLP

(57) ABSTRACT

A primary technical goal of this strip brush seal device is to prevent friction of a lifting portion of a seal portion against the circumference of a rotary shaft and to improve the seal capability thereof. In the strip brush seal device, each seal strip in a seal portion forms a stoppage portion in the radially outward portion thereof and a lifting strip in the radially inward portion thereof wherein the lifting strip is inflected toward the rotational direction of the rotary shaft at a second angle ($\theta$) to the tangential direction of the circumference of the rotary shaft and the second angle ($\theta$) is in the range of from 0 to 40 degrees.

5 Claims, 23 Drawing Sheets

PORTION "A"

STRIP BRUSH SEAL

BACKGROUND OF THE INVENTION

1. Field of the Invention

The present invention relates generally to a strip brush seal arrangement to effect a seal between a rotary shaft of a compressor, gas turbine engine, refrigerator, pump or the like, and a housing containing the rotary shaft therein. More particularly, this invention relates to a technical domain of strip brush seals in which a lifting portion located the free end side of the seal portion is arranged at an angle relative to the diameter surface of the rotary shaft in order to increase a lifting force and to decrease friction under relative movements.

2. Description of the Related Art

Related art of the present invention is found in U.S. Pat. No. 6,343,792, which discloses a strip brush seal device 100 as shown in FIG. 21. In the strip brush seal device 100 of FIG. 21, a plurality of circularly bent, thin strip brushes 109, also called "leaves", are arranged along the circumference of a rotary shaft 120 to form an annularly-shaped body. The annularly-shaped strip brush 109 is capable of separating a high pressure region P1 from a low pressure region P2.

A plurality of the strip brushes 109 are arranged to form an annularly-shaped body as a whole wherein the outer perimeter edges of the strip brushes 109 are welded at soldering portions 105 in an integral manner. The annularly-shaped outer perimeter surface thus formed by the soldering portions 105 defines a mounting portion 104, by means of which the annularly-shaped is installed onto a housing 110. A back plate 102 is disposed on one side of the strip brushes 109 which is in the low pressure region P2 whilst a retainer plate 103 is disposed on the other side which is in the high pressure region P1. The back plate 102 and the retainer plate 103 provide supports on the both sides of the strip brushes 109, and the back plate 102 effects a seal against a fluid located in the high pressure region P1. At the same time a seal against leakage of the fluid to the low pressure side P2 between the back plate 102 and the rotary shaft 120 is effected by a plurality of the strip brushes 109 constituting the annular shape.

However, the strip brush 109 retains a curved surface protruding in the rotational direction of the rotary shaft 120. Furthermore, as the strip brush 109 is made rather rigid, the free end surface of the strip brush 109 fits the outer diameter surface of the rotary shaft 120 with a relatively large clearance therebetween. The large fit clearance makes it difficult to effect a seal against the fluid. Also the strip brush 109 is bent to a circular shape such that the free end tip is directed toward the center of the rotary shaft 120. If the strip brush 109 increases its rigidity, the strip brush 109 exhibits less elastic deformation. Therefore the sliding surface of the strip brush 109 is subjected to wear when the free end tip of the strip brush 109 comes in contact with the rotary shaft 120 because of a vibration of the rotary shaft 120 or the like.

Thickness of the strip brush 109 is 0.1 mm and since the clearance gap between adjacent surfaces of the densely packed strip brushes 109 is arranged small, losing the degree-of-freedom in the strip brush 109 may worsen its elasticity. In particular, when the strip brush seal device 100 is in a small diameter, a longitudinal length of the strip brush 109 also becomes short. As a result the strip brush 109 substantially loses its elasticity and increasing wear of the strip brush 109 widens the clearance gap, which even worsens the seal capability.

Alternative related art of the present invention is found as a strip brush seal device 100 shown in FIG. 22. Strip brush seal device 100 retaining the strip brush 109 has a similar arrangement to the strip brush seal device 100 of FIG. 21. Fit surface of the strip brush 109 mating with the outer diameter surface of the rotary shaft 120 disposes a step 130 thereon in the direction of rotation. The depth of the step 130 is denoted by H'. Since the step 130 is less than or equal to the thickness of the strip brush 109, e.g., 0.1 mm, the step 130 is too small to generate a substantial lifting force for the strip brush 109 to depart from the rotary shaft 120 when the fluid acts on the small step 130.

Also as the step 130 is disposed on the free end surface of the strip brush 109, employment of a thicker strip brush 109 makes it even more difficult to provide the strip brush 109 with a sufficient lifting force in order to lift the strip brush 109 off the circumference of the rotary shaft 120, when the relation between the rigidity of the strip brush 109 and the magnitude of the lifting force generated by the fluid is taken into account. Furthermore the step 130 on the thin strip brush 109, which requires precision machining, is not straightforward to manufacture. Use of the step 130 thus increases a machining cost and increases the production cost of the strip brush 109 after all.

Alternative related art of the present invention is found in the aforementioned U.S. Pat. No. 6,343,792, which discloses a strip brush seal device shown in FIG. 23. Strip brush seal device 100 shown in FIG. 23 has a similar arrangement to the strip brush seal device 100 of FIG. 21. In the strip brush seal device 100 of FIG. 23, strip brushes 109 are installed in a groove disposed in the housing 110. The strip brush 109 disposes a step 130 at the free end tip halfway in the axial direction. Since the strip brush 109 is formed halfway width of the strip brush 109, a fluid pressure exerted along the axial direction cannot provide the strip brush 109 with a sufficient lifting force.

In the strip brush seal device 100 shown in FIG. 21 through FIG. 23, as described above, a plurality of strip brushes 109 whose thickness is as small as 0.1 mm are densely piled to form an annularly-shaped body. The piled strip brushes 109 exhibit high stiffness. Therefore when the strip brushes 109 are subjected to a sliding movement relative to the rotary shaft 120, problems still remain in the strip brushes 109 in terms of elastic deformation and reduction of friction forces.

In addition with a strip brush seal comprised of strip brushes 109 which are circularly bent toward the opposite direction relative to the rotational direction, the step 130 disposed in the strip brush 109 cannot generate enough lifting force to lift the strip brush 109 off the rotary shaft 120 even when the fluid pressure acts on the step 130. Also disposing the tiny step 130 on the thin strip brush 109 alone can hardly exhibit a practical, lifting force. It implies that care for wear of the strip brush 109 is far from being sufficient. Fabricating the step 130 on an extremely thin strip imposes another technical difficulty.

The present invention is introduced to alleviate the above mentioned problems. A primary technical goal which this invention tries to achieve is to provide seal strips of a seal portion wiping against a rotary shaft with a lifting force in order to be lifted from the rotary shaft and to decrease friction therebetween, and to improve the seal capability by making use of a pressure generated at the seal portion due to a process fluid. Another technical goal is to simplify the manufacture of the seal strips disposing a lifting means and to decrease the production cost thereof.

SUMMARY OF THE INVENTION

A primary object of the present invention is to resolve the above mentioned technical problems, and preferred technical means of the present invention are realized as follows.

A strip brush seal device related to the present invention is for effecting a seal between one component and a rotary shaft defined as the other component in which the one component and the rotary shaft are in a mating relation with and relatively rotating against each other and the one component is attached with a mounting portion. The strip brush seal device comprises a strip brush seal and a back plate wherein the strip brush seal retains the mounting portion and a seal portion, the mounting portion being disposed in the outer circumference of an annularly-shaped body which is formed by arranging a plurality of thin rectangular seal strips along the circumference of the rotary shaft and the seal portion being located in the radially inward portion of the annularly-shaped body, and the back plate is disposed in the opposite side of the strip brush seal with respect to a fluid. Each seal strip retains a stoppage portion and a lifting portion wherein the stoppage portion is disposed in the radially outward portion of the seal strip relative to the seal portion and the lifting portion (also known as "lifting strip") constitutes the radially inward portion of the seal strip and is arranged at a second angle (θ) to the tangential direction of the circumference of the rotary shaft, the second angle (θ) being in the range of from 0 to 40 degrees.

In the strip brush seal device related to the present invention, wherein the free end tip of the lifting portion being made of a thin strip is arranged at the second angle θ in the range of from 0 to 40 degrees to the tangential direction of the circumference of the rotary shaft which is originated at the point where the free end tip of the lifting portion makes a contact with or comes in close proximity to the circumference of the rotary shaft, a flow of the fluid which enters the inter strip gap between the seal strips of the seal portion is blocked by the back plate and directed toward the lifting portion. It is noted that the one component represents a component for retaining the rotary shaft such as housing or casing there within. The rotary shaft is defined as the other component, but it is not limited to a rotary shaft and an alternative relative component which is subjected to a relative movement will suffice.

The fluid pressure which acts on a space with a triangular cross section formed by the circumference of the rotary shaft and the lifting portion, provides a lifting force against the lifting portion so as to lift the lifting portion off the circumference of the rotary shaft forming a minute gap therebetween. When the lifting portion floats relative to the circumference of the rotary shaft, the fluid starts to flow from the free end of the rotary shaft toward the inter strip gap of the seal strip which is located adjacently forward in the direction of rotation. As a result a small gap is formed between the free end of the lifting portion and the circumference of the rotary shaft. At the same time a pressure increase at the free end of the lifting portion also leads to a pressure increase between the circumference of the rotary shaft and the inner diameter surface of the back plate, which effectively prevents the fluid from leaking through the gap between the circumference of the rotary shaft and the inner diameter surface of the back plate toward a low pressure region. The lifting portion therefore provides not only an effect for avoiding wear against the circumference of the rotary shaft but also another effect for improving the seal capability by increasing the inter surface pressure in the lifting portion.

DETAILED DESCRIPTION OF THE INVENTION

Described below is details of the figures of preferred embodiments of a strip brush seal device constructed in accordance with the principles of the present invention. All the figures explained below are constructed according to actual design drawings with accurate dimensional relations.

Figure 1:
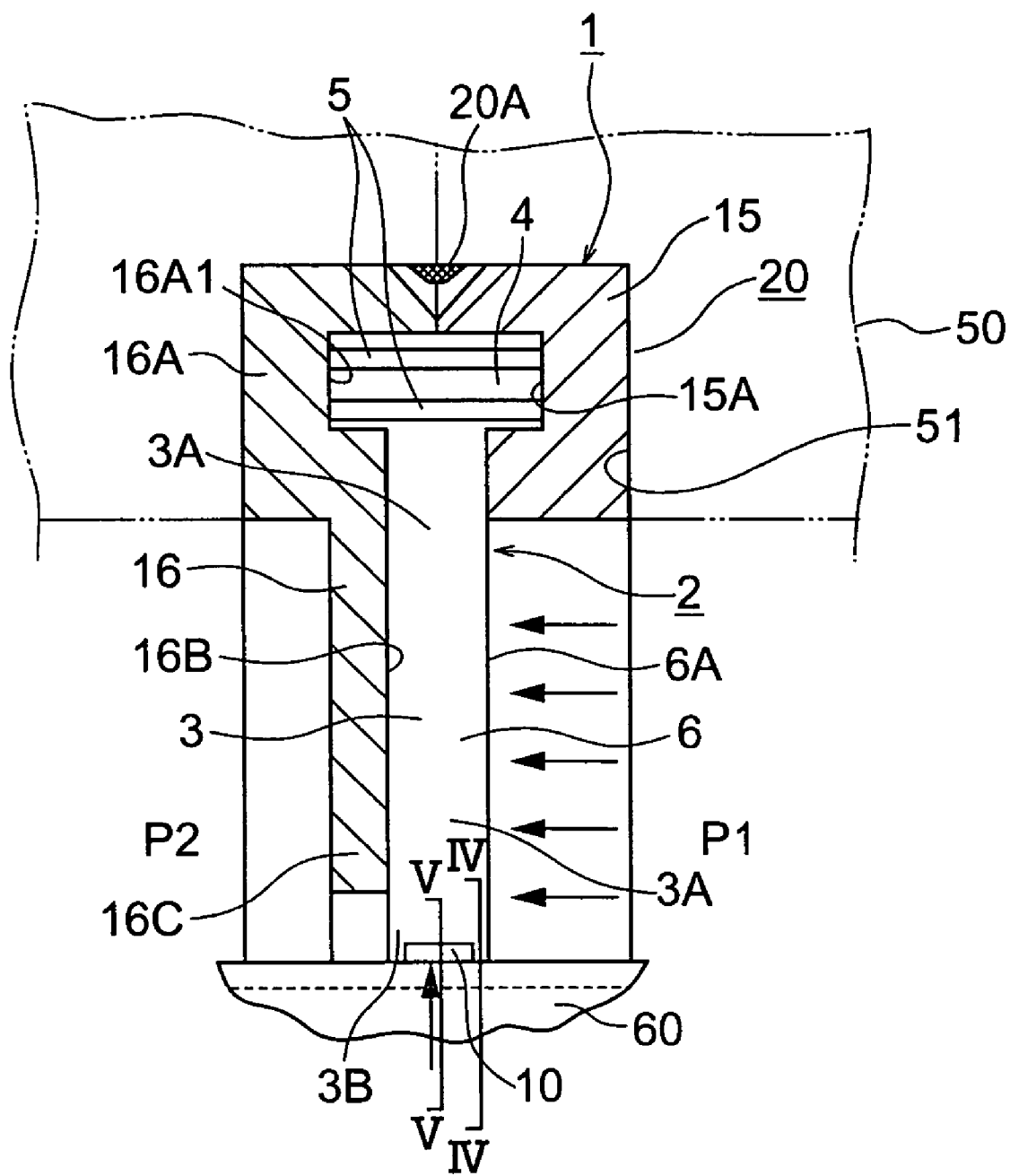
FIG. 1 is a half cross section of a strip brush seal device in an axial direction as a first example according to the present invention.

FIG. 1 shows a strip brush seal device as a first example related to the present invention. The first example will be explained below according to FIG. 1 through FIG. 5.

Figure 2:
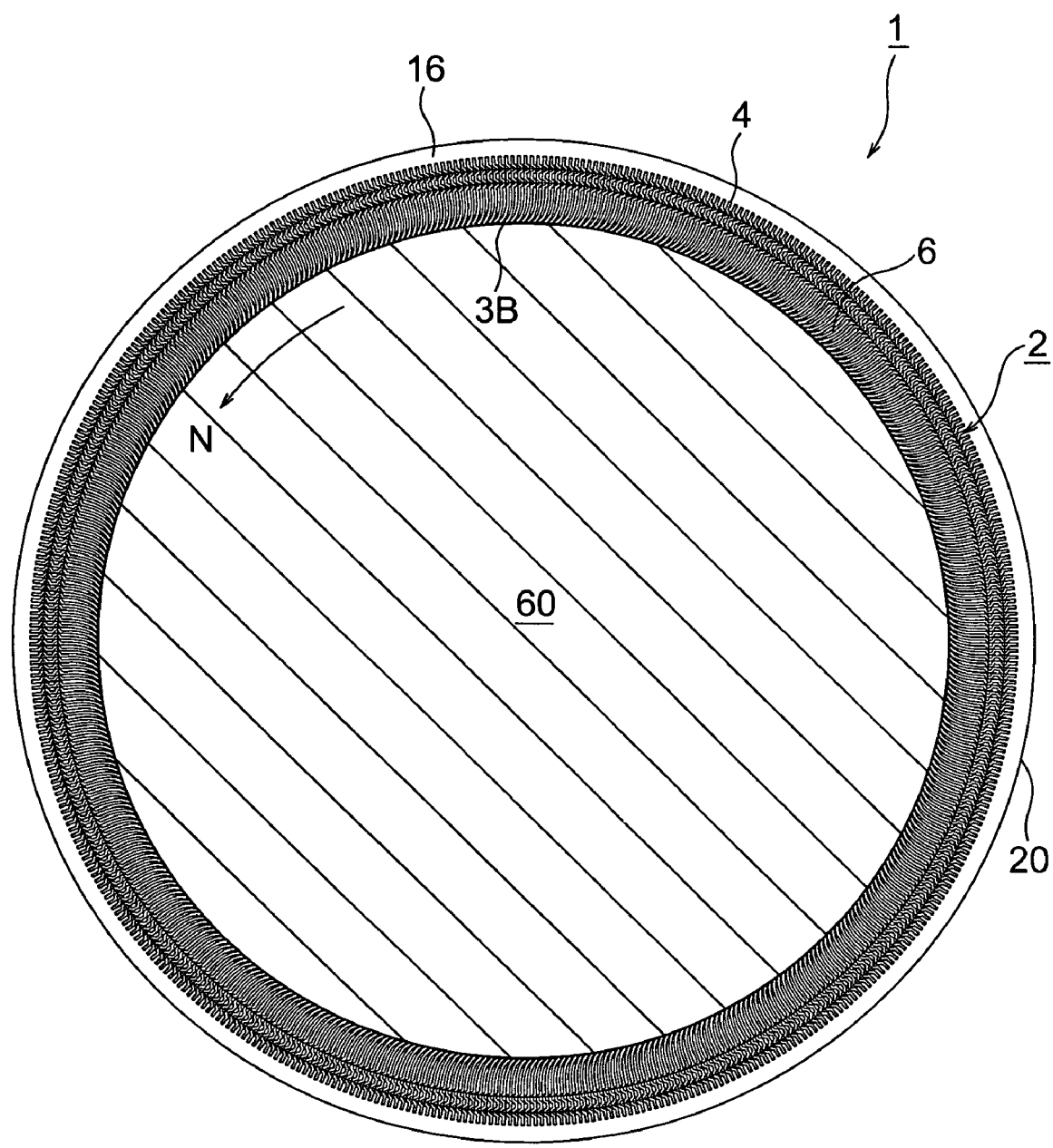
FIG. 2 is a front view of the strip brush seal and the back plate of FIG. 1.
Figure 3:
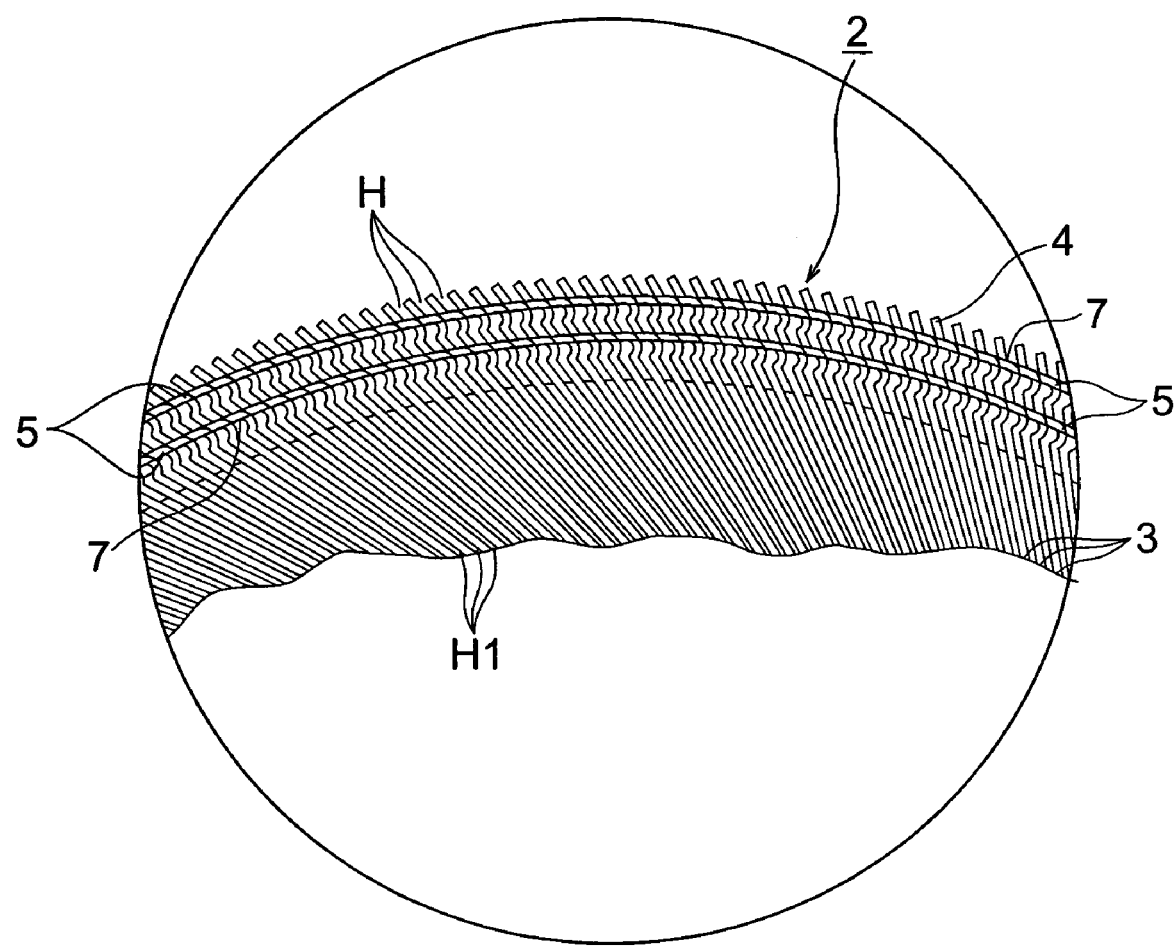
FIG. 3 is an enlarged view of a portion of the mounting portion of FIG. 2.
Figure 4:
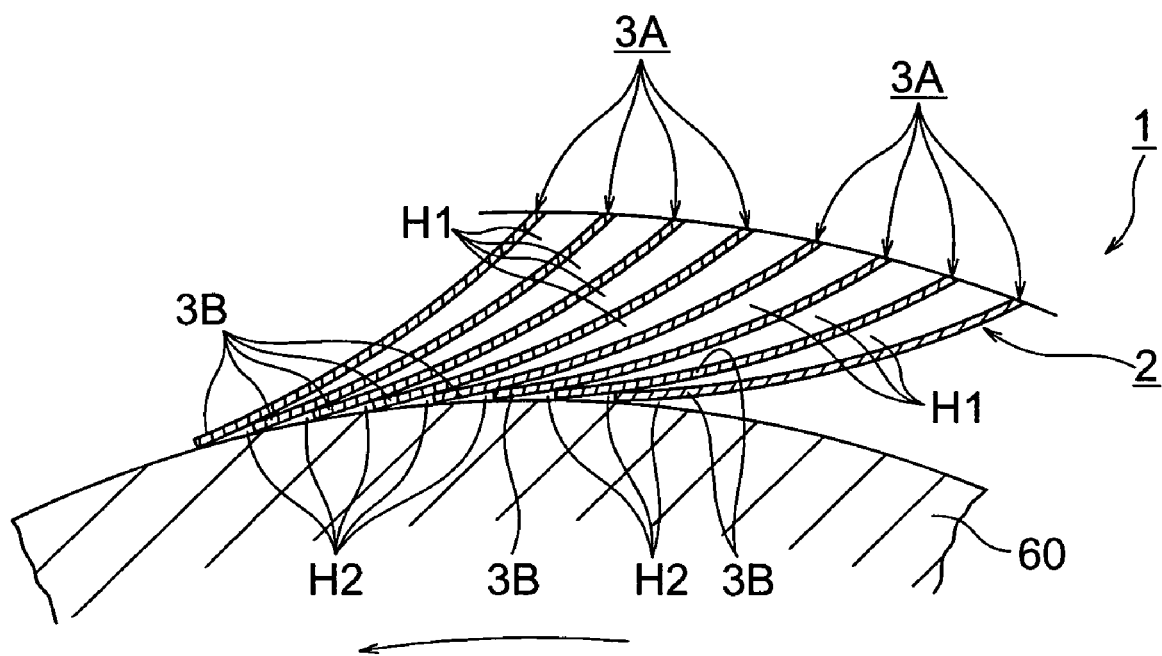
FIG. 4 is a IV—IV cross sectional view of FIG. 1.
Figure 5:
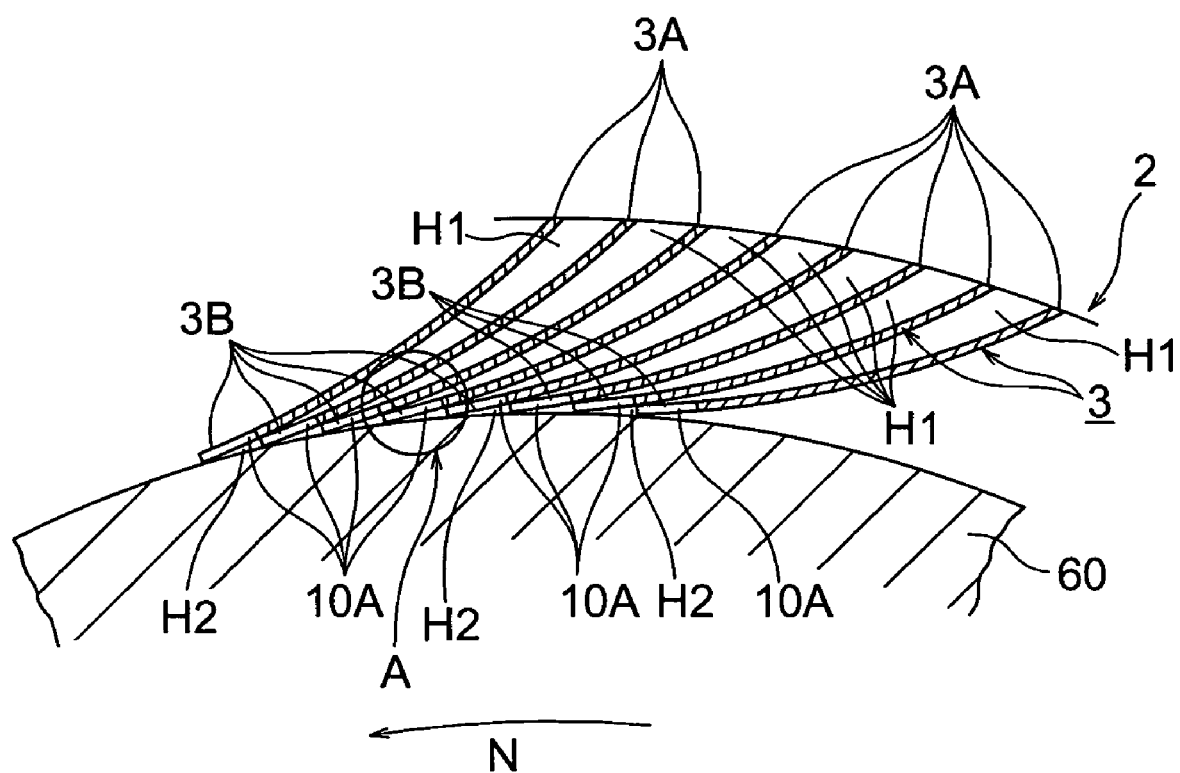
FIG. 5 is a V—V cross sectional view of FIG. 1.

FIG. 1 shows a half cross-sectional view of a strip brush seal device 1 mounted in a housing 50 of a gas turbine engine in order to separate a high pressure region P1 from a low pressure region P2 within a chamber located between the housing 50 and a shaft 60. FIG. 2 is a front view of the strip brush seal 2 and the back plate 16 disposed in the strip brush seal device 1 of FIG. 1. FIG. 3 is an enlarged front view of a portion of the mounting portion 4 of the strip brush seal 2 in FIG. 2. In addition, FIG. 4 is a cross sectional view of FIG. 1 at "IV—IV" cross section while FIG. 5 is a cross sectional view of FIG. 1 at "V—V" cross section.

In FIG. 1, the shaft 60 extends through a bore of the housing 50 with a clearance gap therebetween wherein the housing 50 is represented by a double-dotted line. The shaft 60 and the housing 50 are subjected to a relative movement. The strip brush seal 2 consists of a plurality of thin seal strips 3 wherein the seal strips 3 are arranged at an angle relative to a rotational direction "N" of the rotary shaft 60 along the outer diameter surface of the rotary shaft 60 for defining an annular shape. A mounting portion 4 is disposed at the outer circumference of the strip seal brush 2 while a seal portion 6 is disposed at the inner circumference. Inclination of the seal strip 3 is defined by a two-tier inclination angle as shown in FIG. 19 and FIG. 20.

Figure 19:
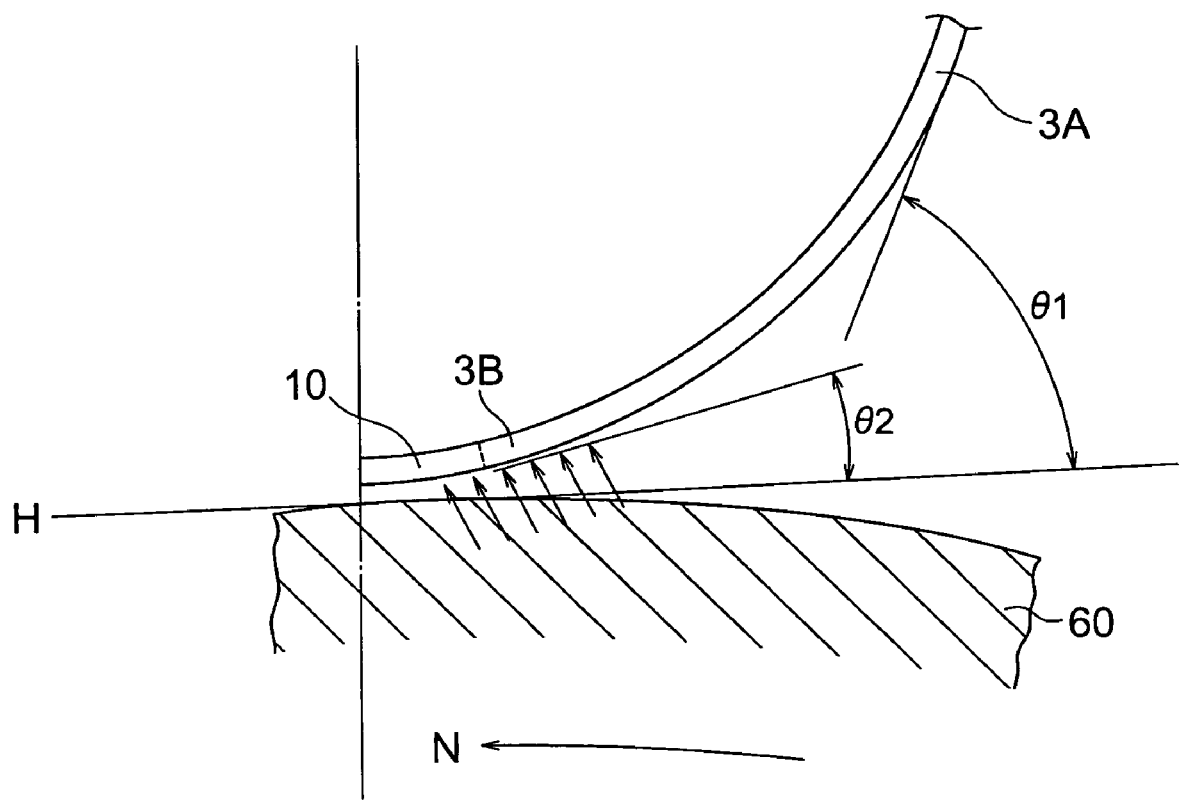
FIG. 19 is a side view of a seal strip in a seal portion which is arranged at a first and second angles as an example of a seal strip related to the present invention.
Figure 20:
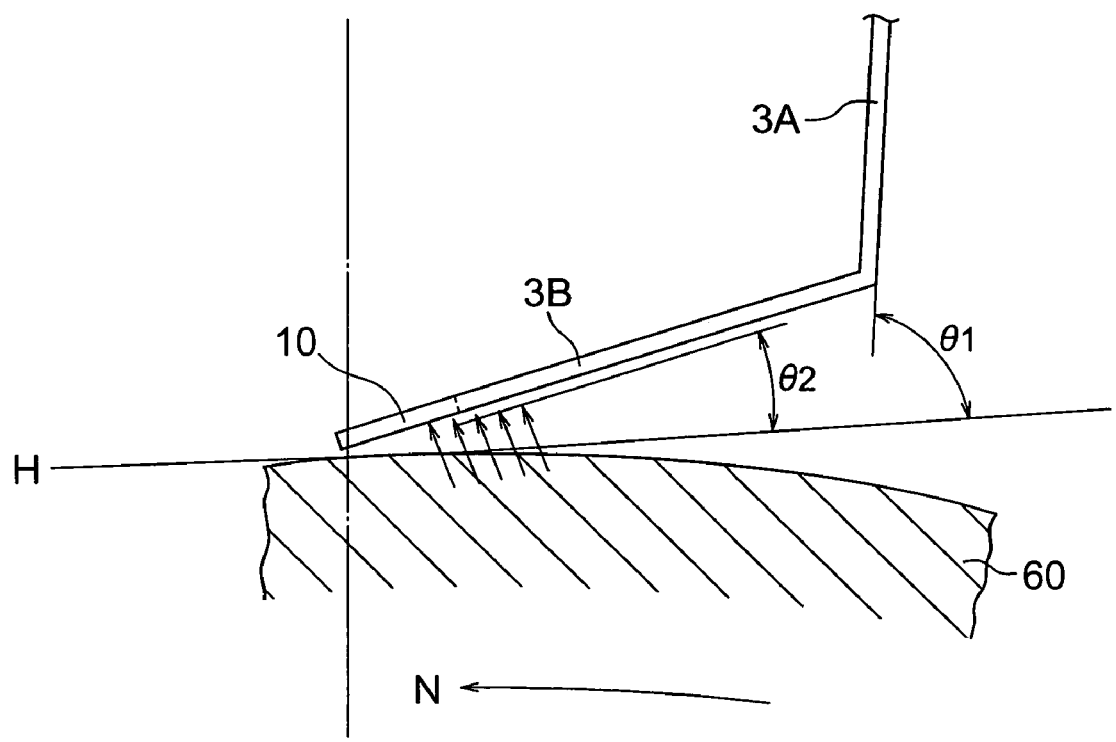
FIG. 20 is a side view of a seal strip in a seal portion which is arranged at a first and second angles as an alternative example of a seal strip related to the present invention.
Figure 21:
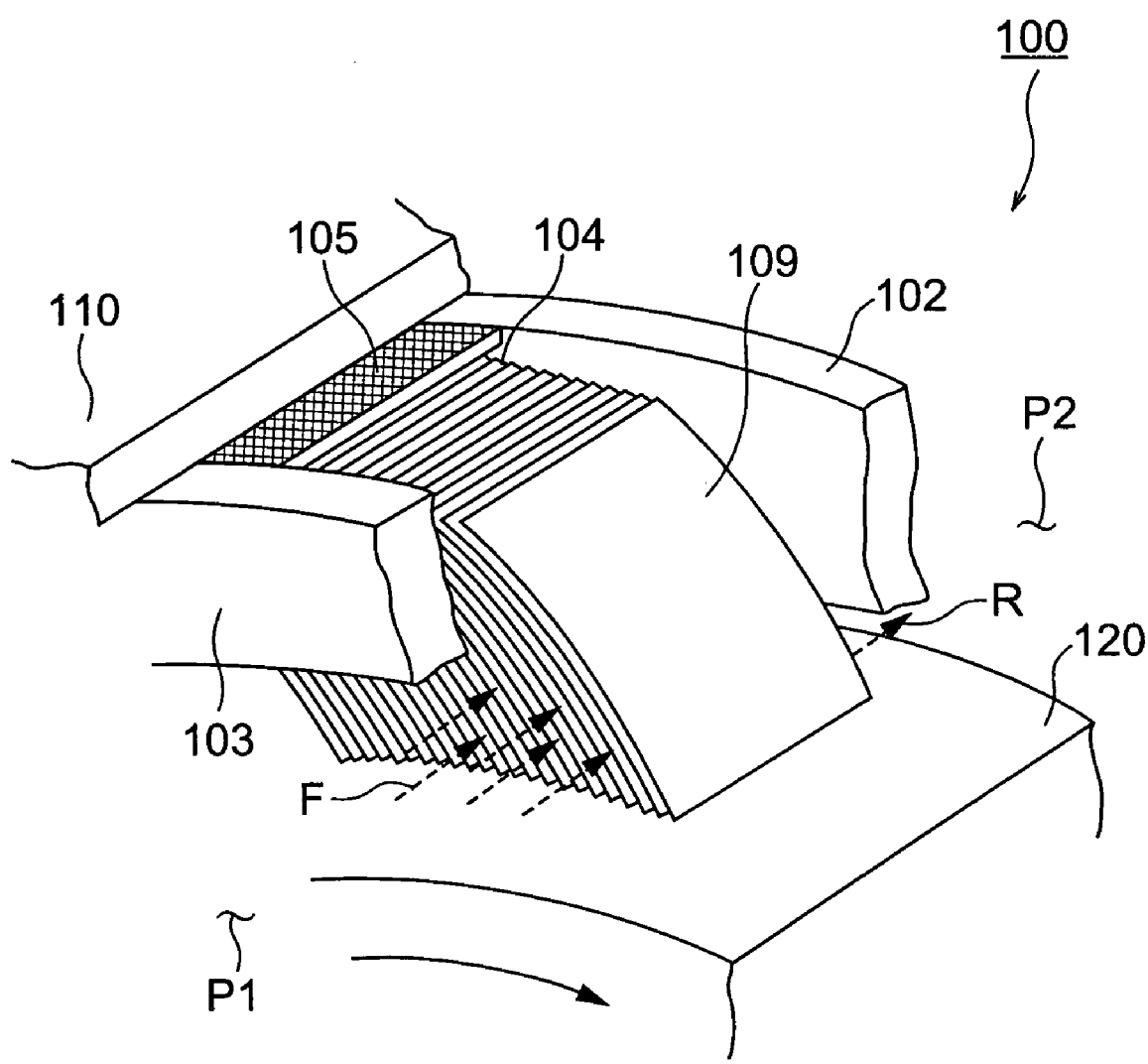
FIG. 21 is an oblique view of a strip brush seal device of a related art of the present invention.
Figure 22:
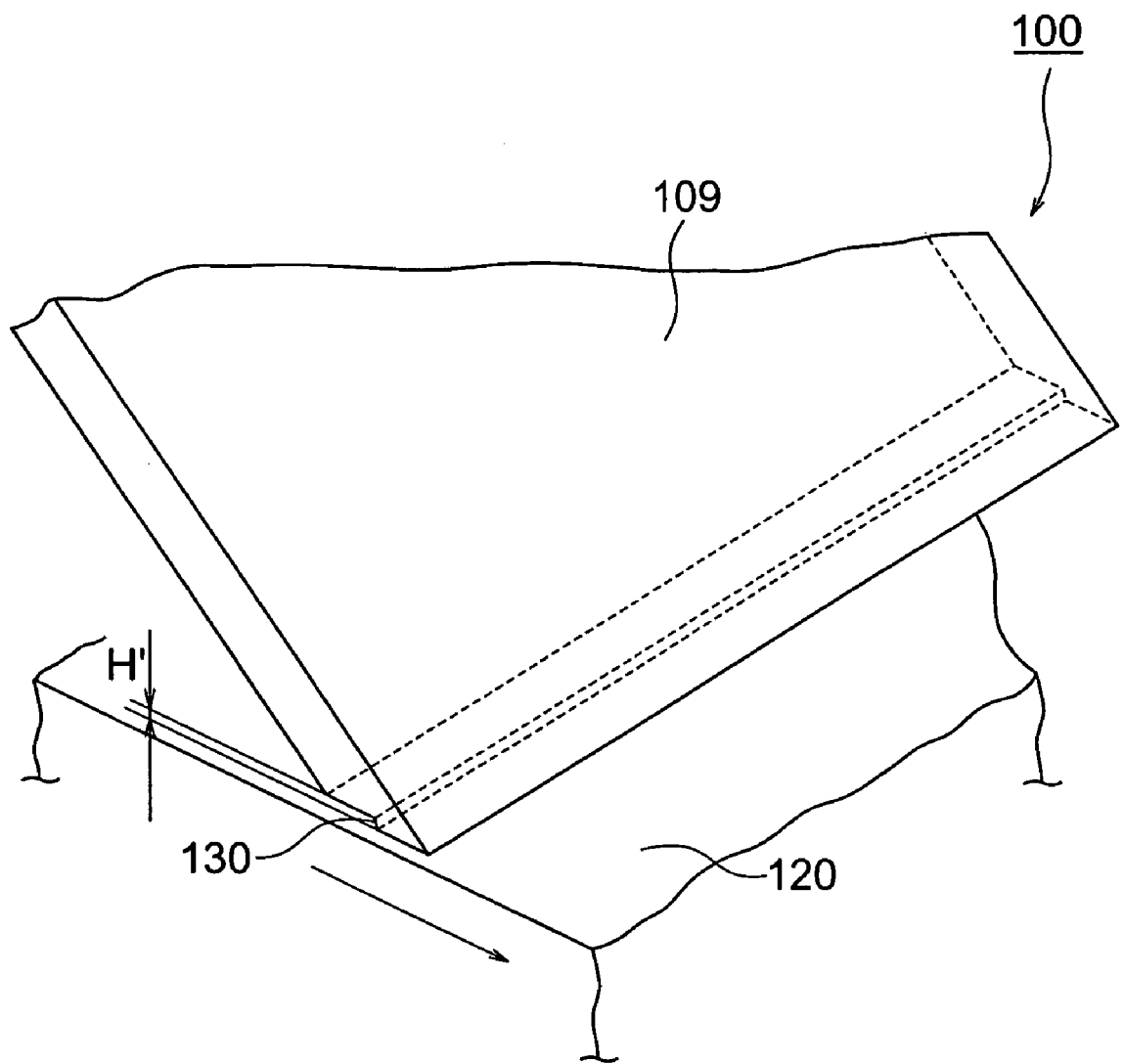
FIG. 22 is an oblique view of a strip brush seal of an alternative related art of the present invention.
Figure 23:
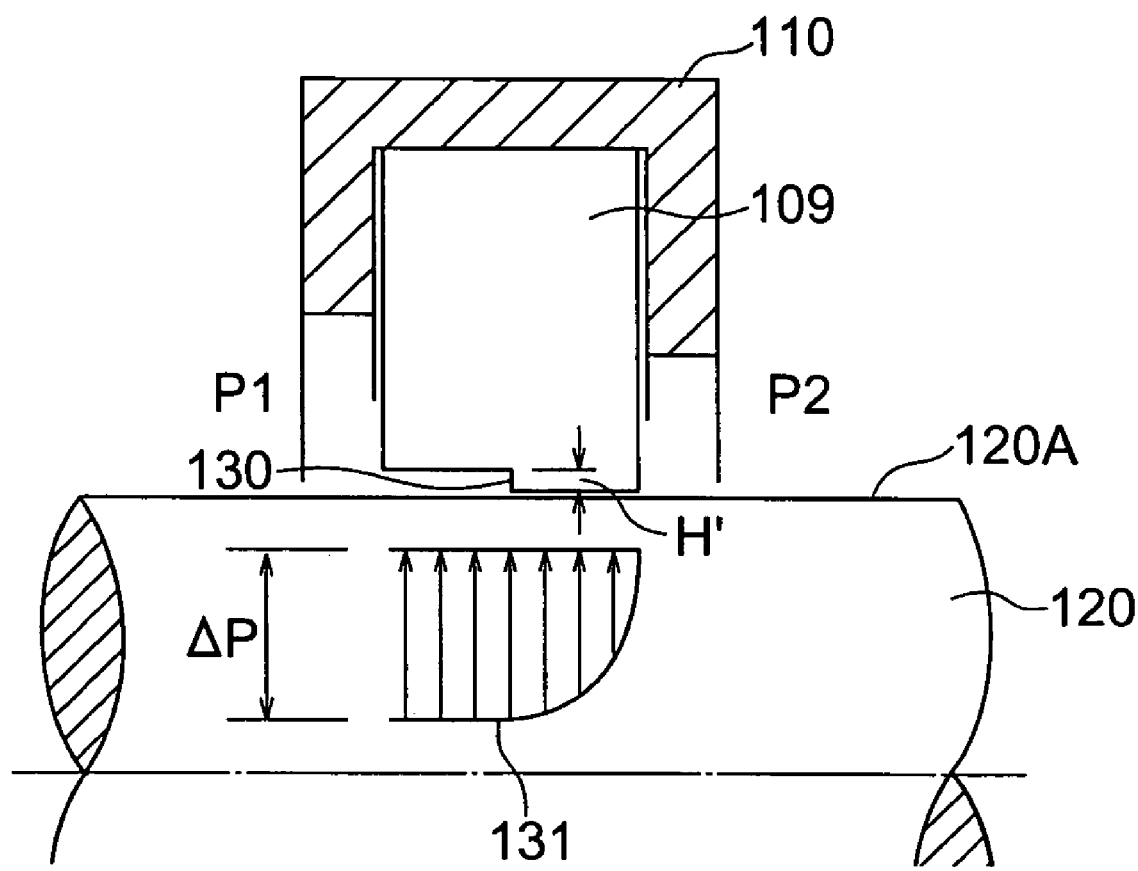
FIG. 23 is an oblique view of a strip brush seal device of another alternative related art of the present invention.

In the seal portion 6, a stoppage portion 3A (it is hereafter called a stoppage strip) of the seal strip 3 located closer to the mounting portion 4, as shown in FIG. 19 and FIG. 20, makes a first angle $\theta 1$ at an origin defined by the free end tip of the seal strip 3 in reference with the tangential direction "H" of the circumferential surface of the rotary shaft 60. The first angle $\theta 1$ is arranged larger than the second angle $\theta$. Also in the seal portion 6, a lifting portion 3B (it is hereafter called a lifting strip) located in the free end side of the seal strip 3 makes the second angle $\theta$ with respect to the tangential direction "H" of the circumferential surface of the rotary shaft 60, preferably in the range of from 0 to 45 degrees. More preferably, $\theta$ should be in the range of from 0 to 40 degree.

Assembly of the strip brush seal 2 with the mounting portion 4, the back plate 16 and the retainer plate 15 is integrated by means of a joint portion 20A. The outer circumferential portion of the integrated assembly unit is defined as a fixing portion 20 which is mounted onto a groove portion 51 disposed in the housing 50. Instead, the outer perimeter of the mounting portion 4 integrally welded may be directly installed in the annularly-shaped groove 51 of the housing 50 without a support from a back plate 16. Also a strip brush seal 2 in FIG. 2 and a back plate 16 as an integral unit can be installed together in the groove 51 of the housing 50.

The inner portion of the strip brush seal 2 constitutes a seal portion 6 which is an inner portion of an annularly-shaped body being formed by piling a plurality of seal strips 3. The seal strip 3 in the seal portion 6 includes a stoppage strip 3A and a lifting strip 3B; the stoppage strip 3A is a portion of the seal portion 6 located from the inflection point toward the mounting portion 4 and the lifting strip 3B is located form the inflection point toward the free end edge. The individual lifting strips 3B are arranged at a small angle with respect to the tangential direction "H" of the rotary shaft 60 wherein adjacent lifting strips 3B come in contact or in close proximity with each other. The seal portion 6 thus arranged effects a seal against a process fluid between the housing 50 and the rotary shaft 60.

Figure 6:
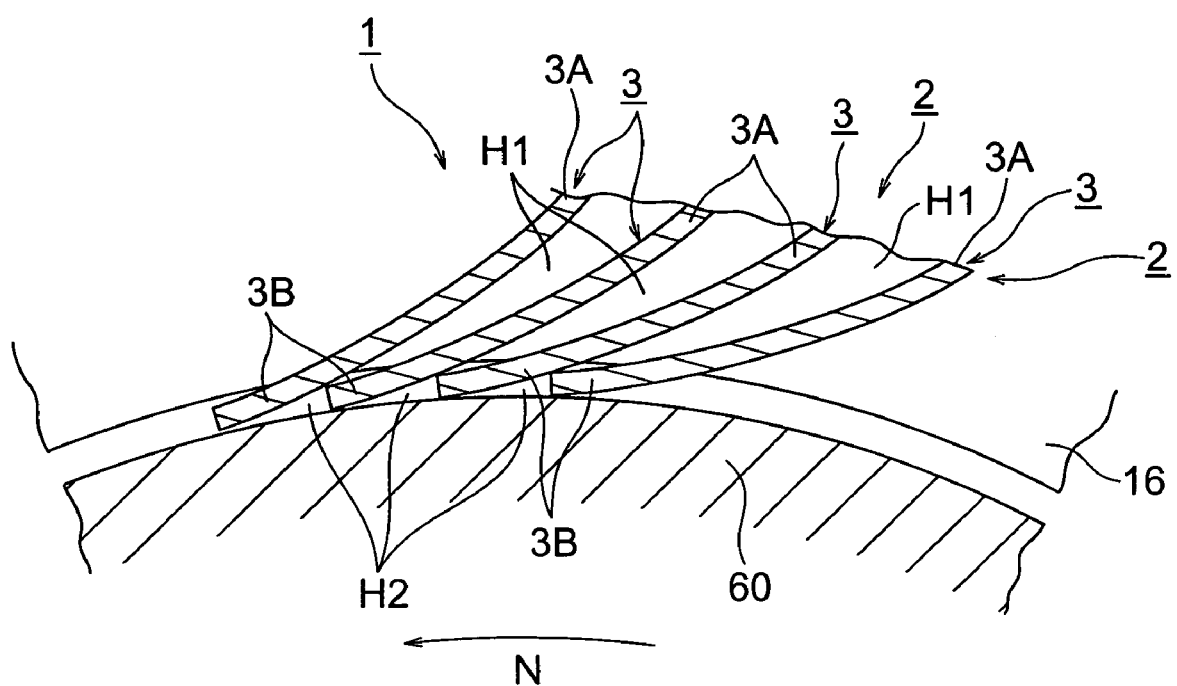
FIG. 6 is a radially cut cross section of a portion of a strip brush seal related to a second example according to the present invention.

This strip brush seal 2 disposes a plurality of thin seal strips 3, each of which is bent in two steps as illustrated in FIGS. 19 and 20, along the outer diameter surface of the shaft 60 in such a way that the strips thus disposed as a whole form an annularly-shaped body. As shown in FIG. 6, the mounting portion 4 of the seal strip 3 retains spacer portions 5 (continuous protrusion portions) which constitute straight ridges over a full width of the strip 3 wherein the ridge is fabricated by locally bending the strip to form a contour in a shape of circular-arc or semi-circle. Although the spacer portions 5 in FIG. 6 have two threads, a single thread or triple threads can be used instead. The number of thread can be determined based on the consideration on the strength of the welded portion wherein the spacer portions 5 are integrally welded at the side of the protrusions along the line of arrangement in order to integrate a plurality of mounting portions 4. Height of the spacer portions 5 is chosen in such a way that the arranged surfaces of the lifting strips 3B in the seal portions 6 come in contact or in close proximity relative to each other. At the same time the tips of the lifting strips 3B in the seal portion 6 are disposed in contact or in close proximity relative to the rotary shaft 60.

The height of the protrusion portions 5, being dependent on the radial dimensions of the strip brush seal 2, can be $10^{-6}$ m as an example. Dimension of the inter strip gap of the seal strips 3 in the seal portion 6 thus arranged affects the seal capability against a process fluid. The inter strip gap of the seal strips 3 is also arranged such that the seal strips 3 exhibit a substantial elasticity when the seal portions 6 come in contact with the rotary shaft 60. The smaller the inter strip gap becomes, the more seal performance will be exhibited. At the same time, however, resilient flexibility of the seal strips 3 is decreased. On the other hand, increasing the inter strip gap leads to a decrease in the seal capability as well as an improvement of the resilient flexibility. Thus having seal strips whose thickness is gradually decreased toward the free end tip will provide a good result. Details on this arrangement will be described later.

As previously described the strip brush seal 2 in an integral annular shape can be installed to the groove portion 51 of the housing 50 for effecting a seal against a fluid. Also if the housing 50 has a step wall surface corresponding to a back plate 16, the strip brush seal 2 of an integral annular shape can be mounted to the housing 50. However, in order to improve the seal capability of the strip brush seal device 1, it is preferable to dispose a ring-shaped back plate 16 in the opposite side to a surface where the fluid acts on. The back plate 16 disposes a mount groove portion 16A1 on the joint surface of an outer perimeter portion 16A wherein the mounting portion 4 is engaged in the mount groove portion 16A1. Also a radially inward portion 16C of the back plate 16 fits with the rotary shaft 60 with a clearance gap therebetween. The inner diameter surface of the radially inward portion 16C is arranged larger than the outer diameter surface of the rotary shaft 60 such that the both surfaces do not touch with each other. The back surface 16B of the back plate 16 provides the strip brush seal 2 with a support against the fluid pressure and also prevents the fluid from leaking between the arranged surfaces of the individual seal strips 3 of the strip brush seal 2.

A retainer plate portion 15 disposes a mount groove portion 15A which is arranged symmetrically to the back plate 16 with respect to the strip brush seal 2 wherein the mount groove portion 15A is similar to the mount groove portion 16A1 of the back plate 16. This mount groove portion 10A is engaged with the mounting portion 4 to hold the mounting portion 4. The back plate 16 and the retainer plate portion 15 are oppositely made in contact to form a contact surface wherein the outer perimeter portion of the contact surface is welded. The welded portion is defined as a joint portion 20A and the whole radially outward portion is defined as a fixing portion 20. As an alternative means to obtain the fixing portion 20, an O-ring can be disposed around the contact surface between the back plate 16 and the retainer plate portion 15 without welding at the outer perimeter portion between the back plate 16 and the retainer plate portion 15. The fixing portion 20 consisting of the back plate 16 and the retainer plate portion 10, which are in contact with each other, is installed in the groove portion 51 of the housing 50, followed by fastening bolts for a secure assembly.

Strip brush seal 2 is arranged as shown in FIG. 2 whose details have already been explained above. A plurality of thin strip brushes 3 shown in FIG. 19 or FIG. 20 of a rectangular shape which are bent along a circular-arc or inflected halfway (θ1) and disposed at an angle (θ) relative to the rotary direction N of the shaft 60, are densely piled along the diameter surface of a rotary shaft 60 to form an annularly-shaped body. The side surface of the mounting portion 4 of the strip brush seal 2, as seen in FIG. 3, is welded along the line connecting the ridges of the spacer portions 5 and a joining portion 7 with two welding threads are formed. The spacer portions 5 disposed on the arranged surfaces shown in FIG. 3 form a protrusion protruding perpendicularly relative to the surface over the full width of the mounting portion 4. The spacer portions 5 thus arranged are called continuous protrusions.

If the spacer portions 5 are disposed at least at the both ends of the mounting portion 4, welding at the side edges of the mounting portion 4 can be done without having inbetween protrusions between the edges. Furthermore the spacer portions 5 can be fabricated not only by bending but also by alternative deposition methods including chemical processes such as chemical etching or chemical deposit. As far as the height of the continuous protrusions 5 (or spacer portion) shown in FIG. 2 or FIG. 3 is concerned, when a first continuous protrusion 5 (or spacer portion) which is located radially inward is arranged taller than a second continuous protrusion 5 (or spacer portion) which is located radially inward, arranging the individual seal strips 3 to an annular shape automatically adjusts the inter strip gap at the free end side of the lifting strips 3B such that the adjacent surfaces of the lifting strips 3B at the free end lightly abut or come in close proximity with each other.

In the seal strip 3 of the seal portion 6 in FIG. 4, the lifting strip 3B located in the free end side of the seal strip 3, similarly to the seal strip 3 of FIG. 19, is bent at the second angle θ. Inter strip gap of the stoppage strips 3A in the seal portion 6 is defined as a first gap H1. Furthermore the surface of a lifting strip 3B leading to the first gap H1 and the diameter surface of the rotary shaft 60 defines a second gap H2 therebetween which has a triangular cross section. FIG. 4 shows the individual lifting strips 3B at "IV—IV" cross section of the seal portion 6 in FIG. 1. It can be seen that the individual lifting strips 3B are at the second angle θ. The free end tip of the lifting strip 3B in the seal strip 3 is disposed at an angle to the circumference of the rotary shaft 60 such that the free end and the rotary shaft 60 lightly abut or come in close proximity with each other.

Figure 12:
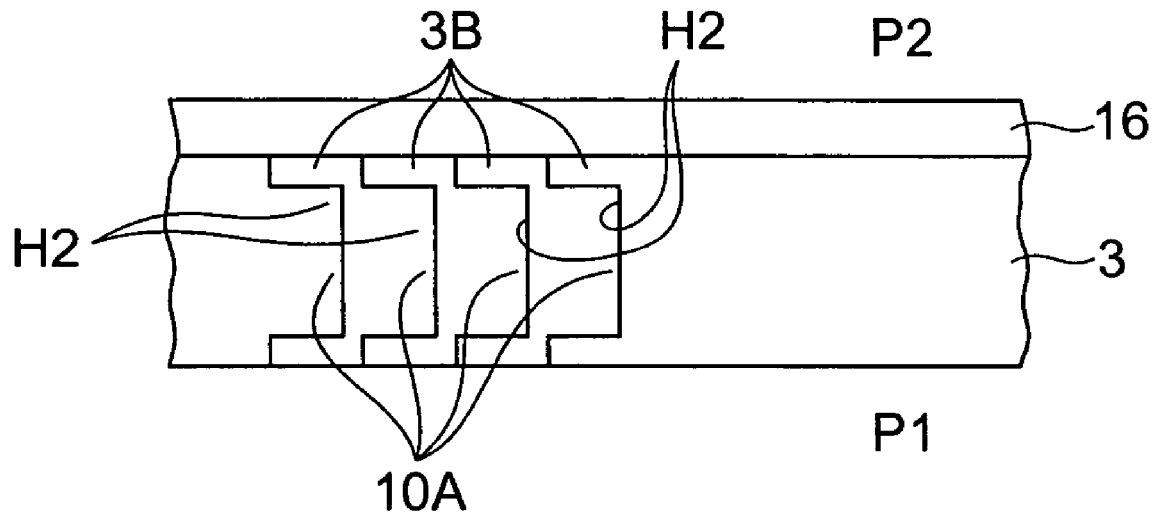
FIG. 12 is a plan view of a lifting strip of the seal portion in FIG. 5 viewed from the free end portion (radially inward).

FIG. 5 shows the individual lifting strips 3B at "V—V" cross section of the seal portion 6 in FIG. 1 and the overall arrangement is more or less the same as FIG. 4. The free end portion of the lifting strip 3B disposes a rectangular notch, as shown in FIG. 12, which defines a first lifting means 10A. The first lifting means 10A disposed in the lifting strip 3B creates a communication passage from a second gap H2 toward a successive second gap H2 located forward. The inter strip gap at the free end tip of the lifting strip 3B is designed such that adjacent seal strips lightly abut or come in close proximity with each other. Also the free end tip of the lifting strip 3B lightly abuts or comes in close proximity with the circumference of the rotary shaft 60. A flow of a fluid allowed to flow in through the first gap H1 flows out to the second gap H2 and, when passing through the first lifting means 10A, generates a lifting force to quickly lift the lifting strip 3B from the circumference of the rotary shaft 60.

Figure 13:
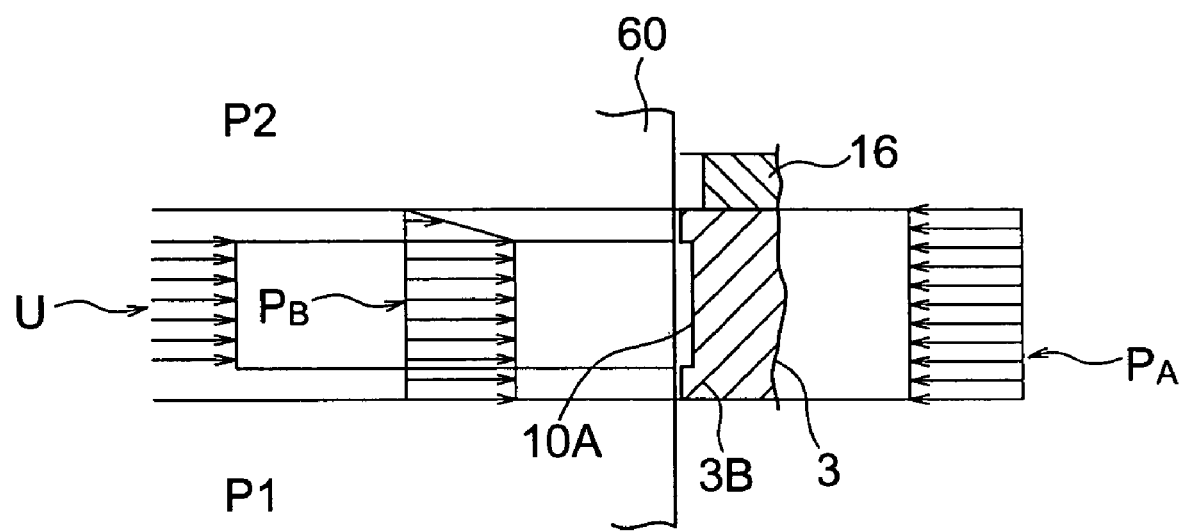
FIG. 13 shows a pressure distribution and lifting force distribution on the lifting strip of FIG. 12 when the fluid pressure acts on the lifting strip.

FIG. 13 shows the pressure distribution of the fluid acting on the lifting strip 3B. It indicates that an urging force exerted to the lifting strip 3B of the seal strip 3 is distributed as $P_A$ along the circumference of the rotary shaft 60. On the other hand, the fluid pressure acting on the lifting strip 3B also provides a uniform pressure distribution $P_B$ in order to lift the lifting strip 3B. This enables the lifting strip 3B to maintain the second gap H2 in a uniform manner without being twisted. Distribution of the lifting force U acted on the lifting strip 3B exerts a uniform force according to the width of the first lifting means 10A such that the lifting strip 3B is lifted away from the circumference of the rotary shaft 60.

Inclination angle θ1 of the seal strip 3 is determined based on the rotational speed of the shaft 60, the magnitude of excursions of the shaft 60, and vibration of the shaft 60. The angle θ1 of the seal strip 3 is in the range of from 50 to 90 degrees relative to the radial direction. Also the seal strip 3 has a rectangular form. Longitudinal dimensions of the rectangular seal strip 3 is that the mounting portion 4 is in the range of from 5 to 10 mm and the seal portion 13 is in the range of from 30 to 50 mm. Also the width of the rectangle is in the range of from 3 to 10 mm. Thickness of the seal strip 3 in use is in the range of from 0.05 to 0.5 mm, more preferably from 0.08 to 0.3 mm. These dimensions are determined depending on the size of a strip brush seal device 1, and a brush seal device 1 in large size required a large seal strip 3 accordingly. Also the higher the fluid pressure becomes, the larger the width necessarily becomes. The seal strip 3 is made of steel sheet, stainless sheet, nickel-based alloy, ceramics sheet or the like.

Figure 7:
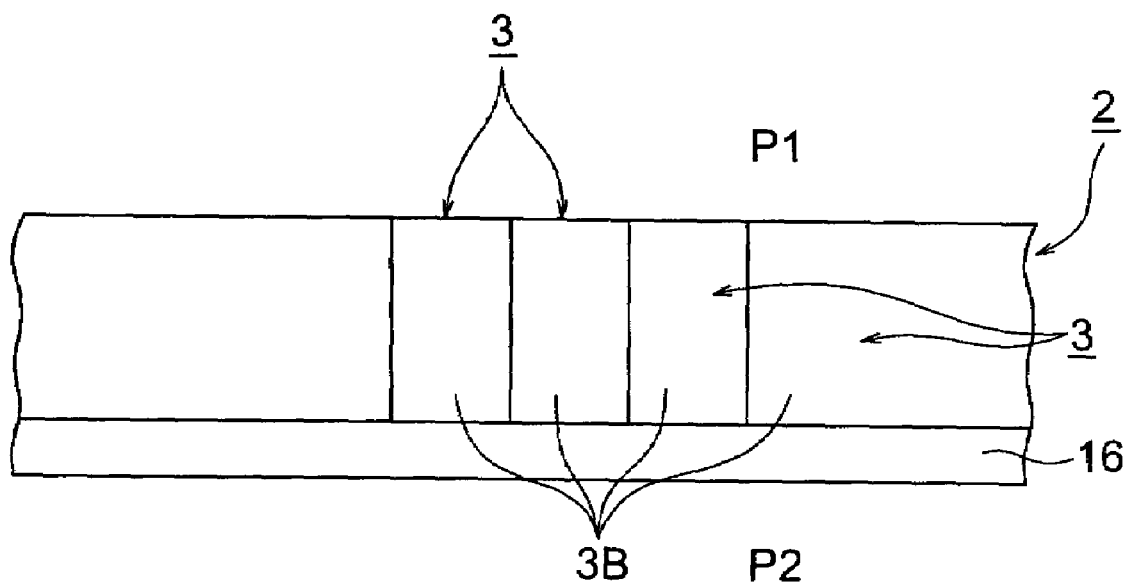
FIG. 7 is a plan view of the strip brush seal of FIG. 6 viewed from the side of the free end portion (radially inward).

Strip brush seal device 1 in FIG. 6 and FIG. 7 is a second example of the present invention. FIG. 7 shows a plan view of a portion of the strip brush seal 2 of FIG. 6 when viewed from radially inward. Strip brush seal device 1 in FIG. 6 has a similar arrangement to that in FIG. 1 and FIG. 2 except a minor difference. Discrepancies in the arrangement of the two inventions are described below. Strip brush seal 2 in FIG. 6 is more or less similar to the arrangement of the lifting strips 3B of the seal portion 6 in FIG. 4. This strip brush seal 2 does not have a notch at the free end tip of the lifting strip 3B as shown in FIG. 7. When a fluid acts on the seal portion 6 and exerts a force against the lifting strip 3B a thin strip constituting the lifting strip 3B serves as a lifting means by itself. In this case the lifting strip 3B is at the second angle θ1 to the circumference of the rotary shaft 60, which is in the range of from 0 to 45 degrees, more preferably 0 to 40 degrees. Therefore a space surrounded by the rotary shaft 60 and the lifting strip 3B making a contact with the rotary shaft 60 forms a shape of wedge.

Figure 14:
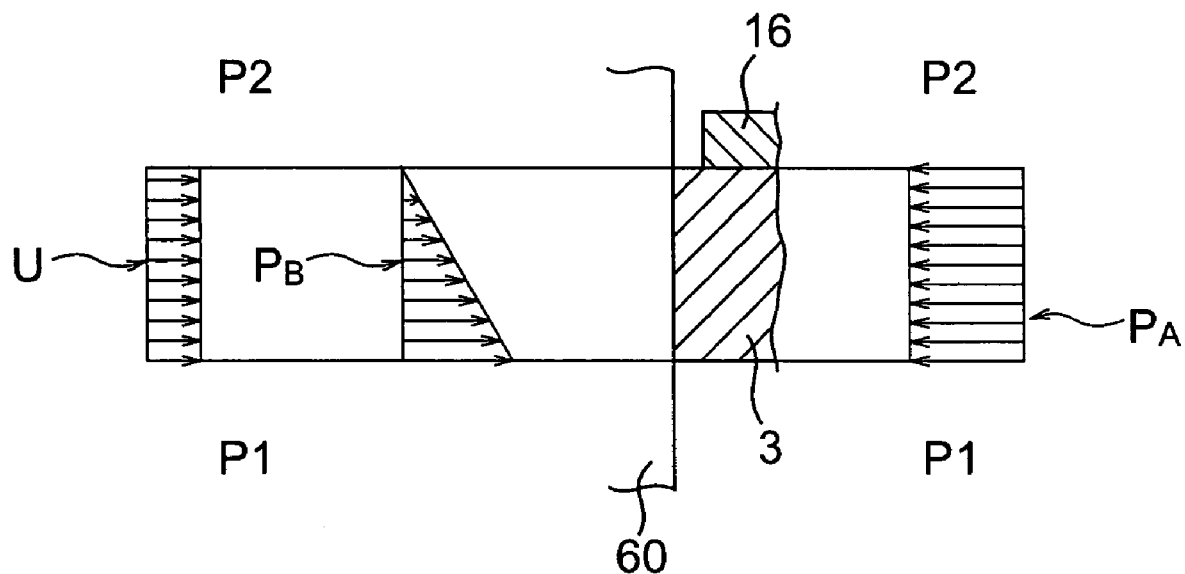
FIG. 14 shows a pressure distribution and lifting force distribution on the lifting strip of FIG. 7 when the fluid pressure acts on the lifting strip.

Each of the lifting strips 3B of the seal portion 6 individually arranged lightly abuts with its adjacent lifting strip at the free end. When a fluid acts on the first gap H1 of the seal portion 6 thus arranged, the fluid pressure also acts on the second gap H2 of the wedged space. The pressure exerted to the second gap H2 provides the lifting strip 3B with a lifting force for floating off the circumference of the rotary shaft 60. The pressure distribution of the fluid acting on the lifting strip 3B is shown in FIG. 14. As a result the lifting strips 3B are kept floating off the circumference of the rotary shaft 60 and remain in a non-contact state relative to the circumference of the rotary shaft 60, which avoids friction. Furthermore as the lifting strip 3B is in a face contact relation with the circumference of the rotary shaft 60 the elastic deformation provided by the lifting strip 3B tolerates excursions of the rotary shaft 60 and reduces friction thereagainst.

Figure 8:
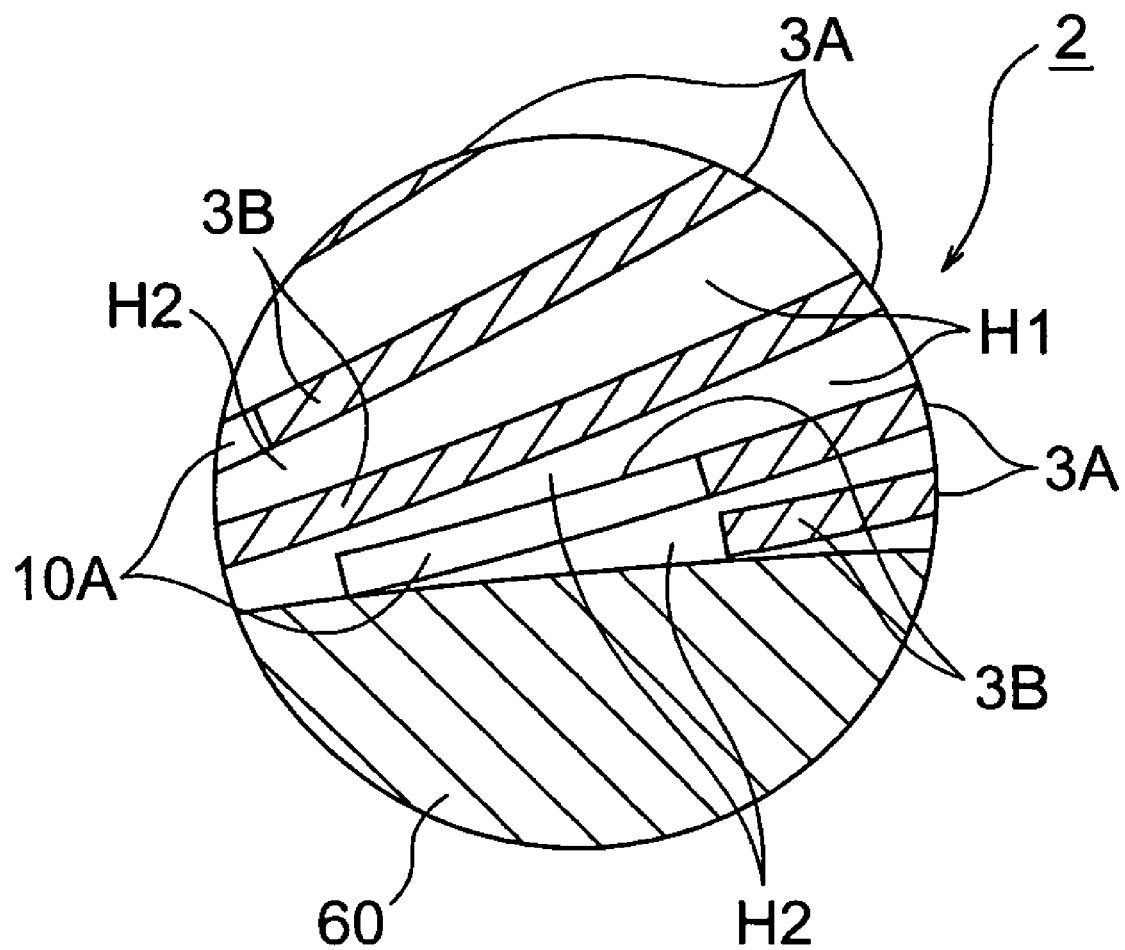
FIG. 8 is a radially cut cross section of a portion of a strip brush seal related to a third example according to the present invention.
Figure 9:
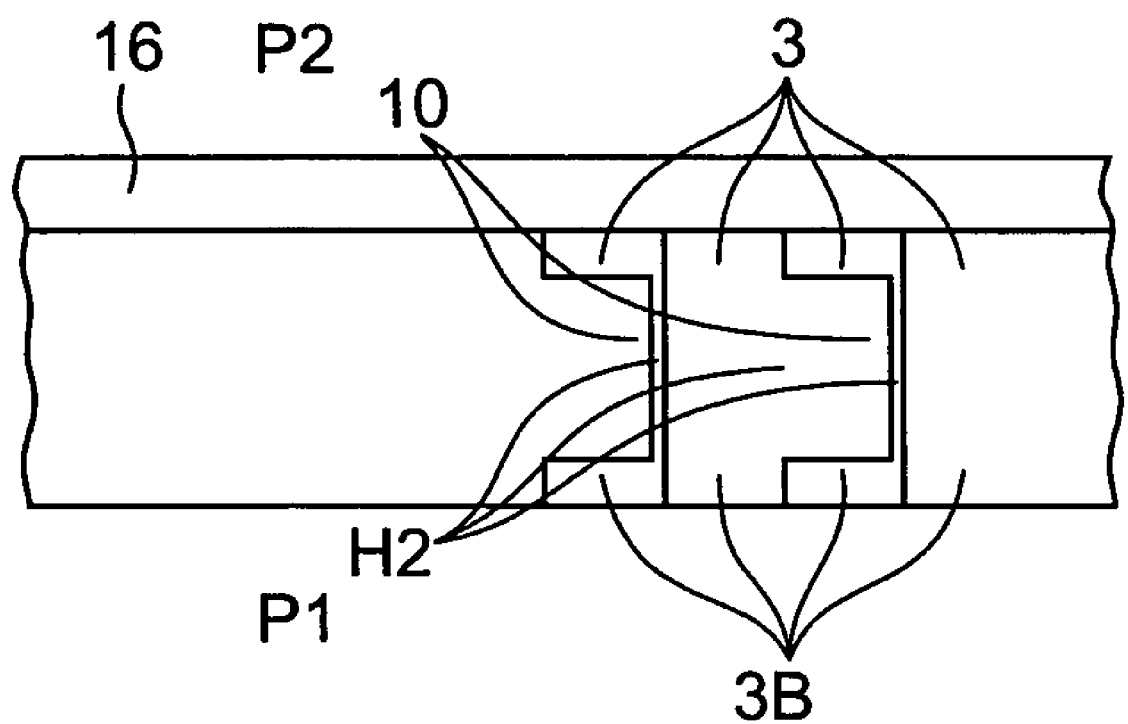
FIG. 9 is a plan view of the strip brush seal of FIG. 8 viewed from the side of the free end portion (radially inward).

Strip brush seal device 1 in FIG. 8 and FIG. 9 is a third example of the present invention. FIG. 8 shows a plan view of a portion of the seal portion 6 of FIG. 8 when viewed from radially inward. Strip brush seal 2 in FIG. 8 has a similar arrangement to that in FIG. 5. FIG. 8 is an enlarged view of the portion "A" of FIG. 5 in order to illustrate differences with respect to the arrangement of the two inventions.

The strip brush seal 2 of FIG. 8 differs from the strip brush seal 2 of FIG. 5 in that a first lifting means 10A is disposed in every other lifting strip 3B. In the arrangement wherein the first lifting means 10A is disposed in every other lifting strip 3B, when a fluid flowing in from the first gap H1 to the second gap H2 passes through the first lifting means 10A which is disposed in the lifting strip 3B the fluid generates a lifting force not only against the lifting strip 3B with the first lifting means 10A but also against adjacent lifting strip 3B with no first lifting means 10A. This is realized as a combined effect of the pressure acted on the second gap H2 with a triangular cross section and the first lifting means 10A. The lifting strip 3B is kept thereby in a non-contact situation relative to the circumference of the rotary shaft 60 and no friction is resulted, hence no wear.

Figure 10:
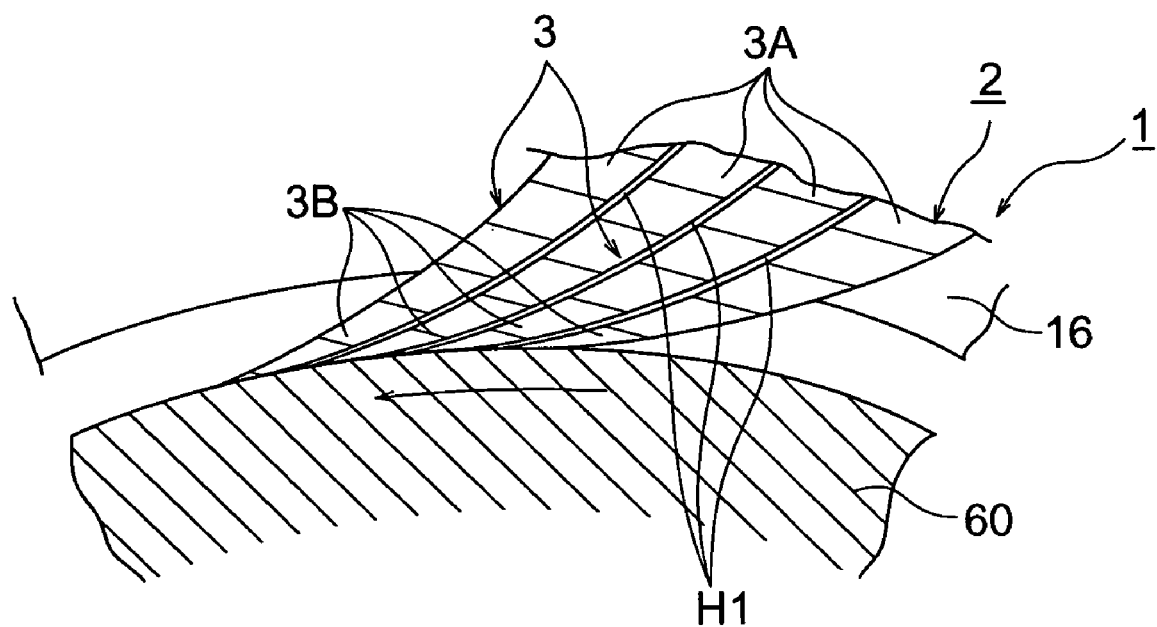
FIG. 10 is a radially cut cross section (corresponding to IV—IV cross section of FIG. 1) of a portion of a strip brush seal related to a fourth example according to the present invention.
Figure 11:
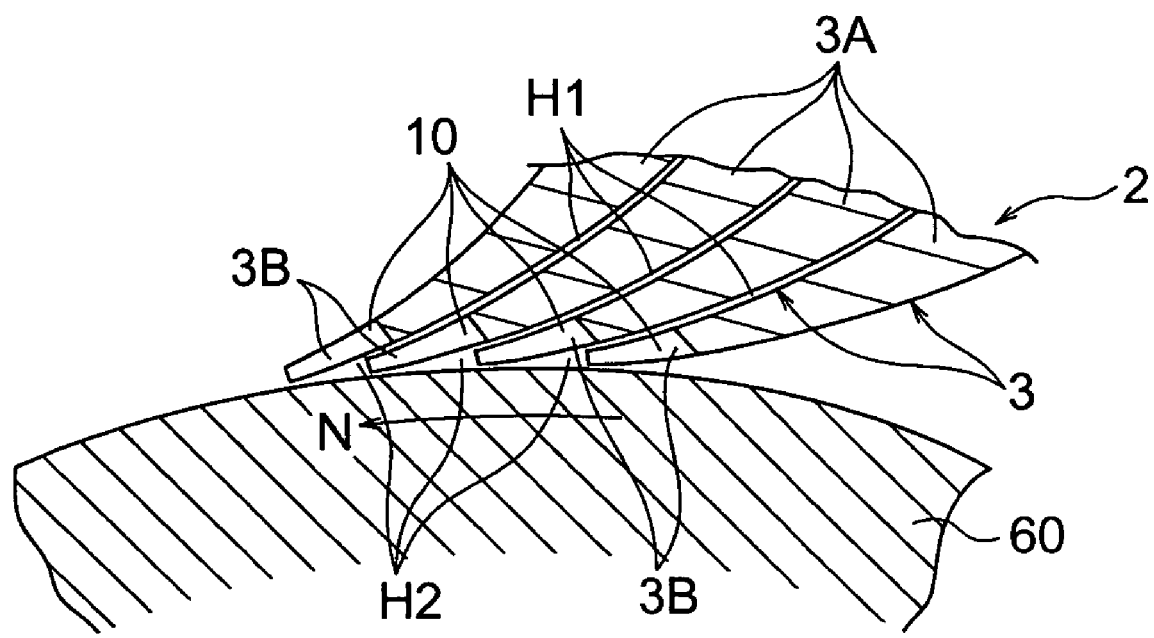
FIG. 11 is a radially cut cross section (corresponding to V—V cross section of FIG. 1) of a portion of a strip brush seal related to a fourth example according to the present invention.

Strip brush seal device 1 in FIG. 10 and FIG. 11 is a fourth example of the present invention. FIG. 10 shows the arrangement of lifting strips 3B of FIG. 1 being cut at "IV—IV" cross section. Likewise, FIG. 11 shows the arrangement of the lifting strips 3B of FIG. 1 at "V—V" cross section. Strip brush seal 2 in FIG. 10 has a similar arrangement to that in FIG. 4. The strip brush seal 2 of FIG. 10 differs from the strip brush seal 2 of FIG. 4 in that the seal strip 3 is made gradually thinner as it approaches its free end tip. Other arrangements are similar to the strip brush seal 2 in FIG. 4.

The seal strip 3 of FIG. 11 is also made gradually thinner as it approaches its free end tip and disposes a lifting means 10 at the free end tip of the lifting strip 3B. Other arrangements are similar to that in FIG. 5. Since the thickness of the seal strip 3 gradually decreases as it approaches the free end tip, the lifting strip 3B can exhibit a substantial elastic deformation due to the thin strip. Such a high resilience of the lifting strip 3B enables the lifting means 10 to take effect. The fact that the lifting strip 3B can be made thin implies that a stoppage strip 3A can be made thick, which in turn implies that a first inter strip gap H1 of the seal portion 6 can be made small and the seal capability of the seal portion 6 is improved thereby. Disposing the stoppage portion 3A in this way can omit a back plate 16 holding up the fluid.

FIG. 12 is a plan view of a seal portion 6 disposing a first lifting means 10A therein when viewed from radially inward. The lifting strip 3B shown in FIG. 12 is the one adopted in the strip brush seal 2 in FIG. 5 and FIG. 11. FIG. 13 shows respective pressure distributions acting on the lifting strip 3 with the first lifting means 10A in FIG. 12. The pressure distribution $P_A$ is the pressure acting on the circumference of the rotary shaft 60 by the fluid pressure as well as the elastic force of the seal strip 3. A lifting force for lifting the lifting strip 3B in a radially outward direction is represented by the lifting force distribution U or the pressure distribution $P_B$ acted on by the fluid. This lifting strip 3B is acted on by the lifting force in a uniform manner and a minute gap is formed relative to the circumference of the rotary shaft 60 thereby. Therefore the minute gap not only prevents the lifting strip 3B from being worn due to friction but also improves the seal capability.

FIG. 14 shows respective pressure distributions acting on the strip brush seal 2 in FIG. 6 and FIG. 7. The pressure distribution $P_A$ in FIG. 14 is the pressure acting on the circumference of the rotary shaft 60 by the fluid pressure as well as the elastic force of the seal strip 3. A lifting force for lifting the lifting strip 3B in a radially outward direction is represented by the lifting force distribution U or the pressure distribution $P_B$ acted on by the fluid. A small pressure provided by the lifting force distribution U creates a minute gap between the lifting strip 3B and the circumference of the rotary shaft 60. The pressure is applied to the entire lifting strip 3B in a uniform manner. This yields an excellent seal capability of the seal portion 6 against the circumference of the rotary shaft 60. The pressure distribution $P_B$ which becomes high in a high pressure region P1 also effects a seal against the fluid.

Figure 15:
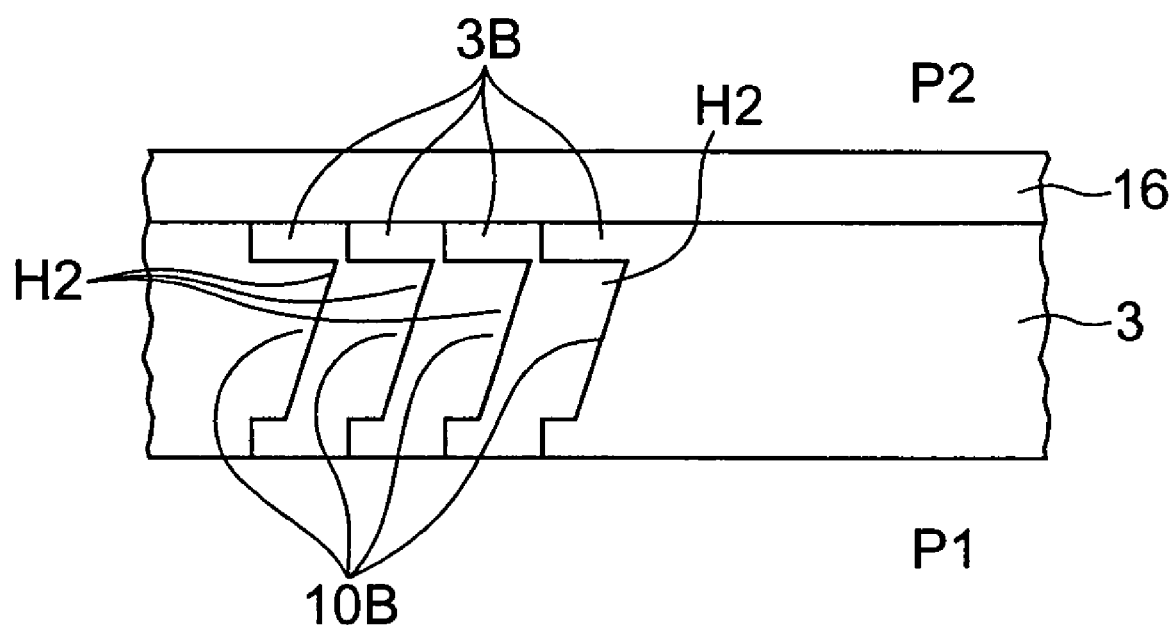
FIG. 15 is a plan view of a second lifting means as a variation of the first lifting means of FIG. 12.

FIG. 15 shows an alternative example of a lifting means 10 disposed in the lifting strip 3B of the seal portion 6. A second lifting means 10B shown in FIG. 15 is a variation of the first lifting means 10A shown in FIG. 12. Pressure distribution of the second lifting means 10B is given in FIG. 16. The pressure distribution $P_A$ and the pressure distribution $P_B$ in FIG. 16 have more or less similar forms to the pressure distribution $P_A$ and the pressure distribution $P_B$ in FIG. 13, respectively. However, the lifting force distribution U becomes high toward the low pressure region P2 side. This second lifting means 10B can improve the seal capability against the fluid because the gap of the lifting strip 3B formed in the high pressure region P1 becomes small.

Figure 16:
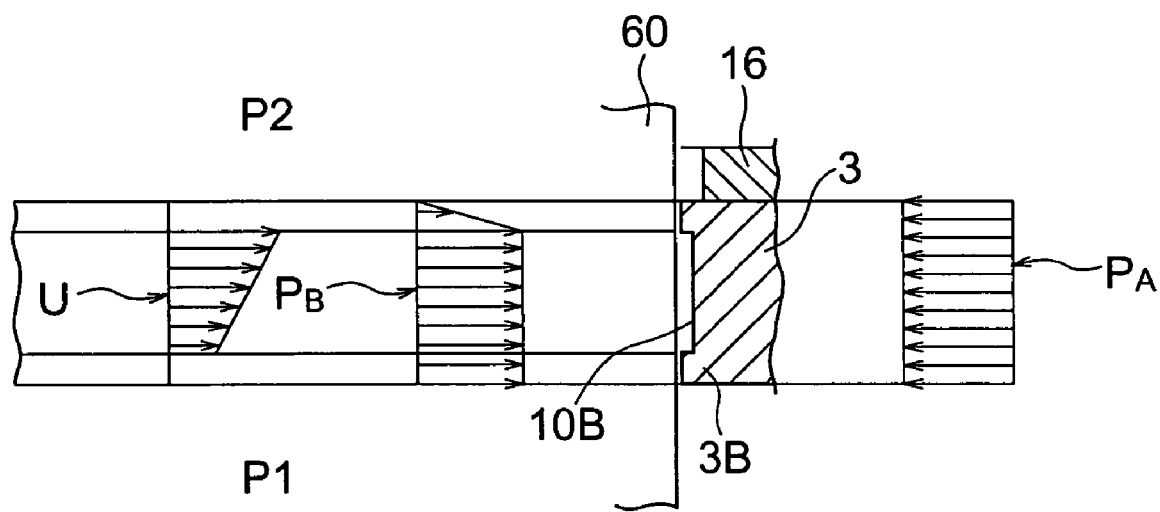
FIG. 16 shows a pressure distribution and lifting force distribution on the lifting strip of FIG. 15 when the fluid pressure acts on the lifting strip.
Figure 17:
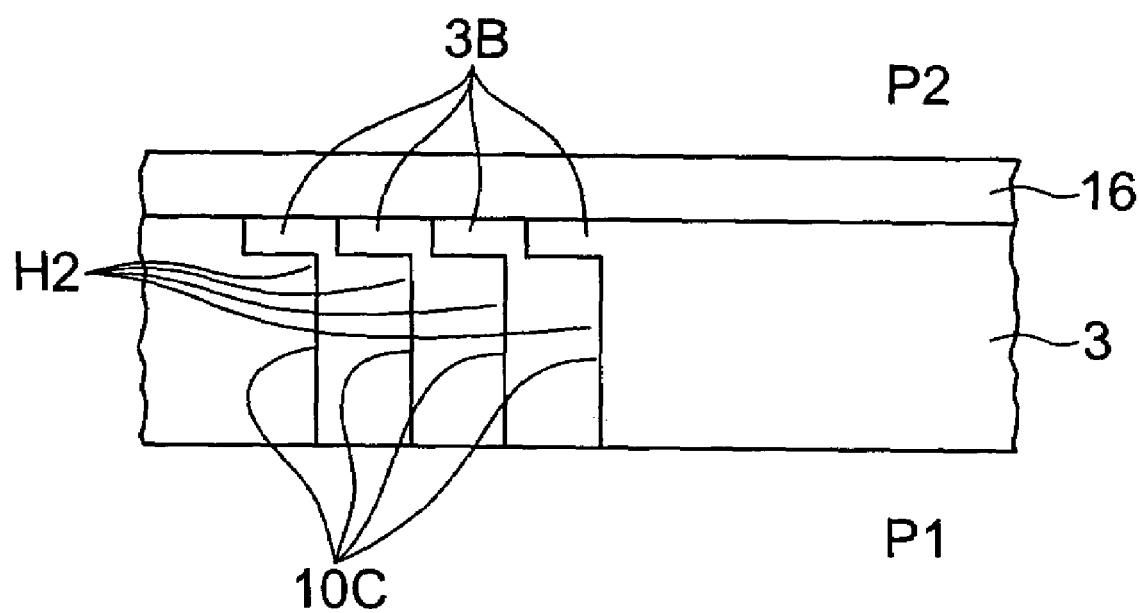
FIG. 17 is a plan view of a third lifting means as a variation of the first lifting means of FIG. 12.

FIG. 17 shows an alternative example of a lifting means 10 disposed in the lifting strip 3B of the seal portion 6. A third lifting means 10C shown in FIG. 17 is a variation of the first lifting means 10A shown in FIG. 12. The pressure distribution $P_A$ and the pressure distribution $P_B$ in FIG. 18 have more or less similar forms to the pressure distribution $P_A$ and the pressure distribution $P_B$ in FIG. 16, respectively. The lifting force distribution U represents a uniformly distributed pressure on the entire third lifting means 10C. This causes to create a minute gap between the lifting strip 3B and the circumference of the rotary shaft 60. In addition the remaining narrow strip portion in the free end tip of the lifting strip 3B provides a substantial elastic deformation. With the lifting force distribution U and the pressure distribution $P_B$, the uniform pressure distribution exhibited therein not only prevents wear but also improves the seal capability. It is noted that the lifting means 10 includes the first lifting means 11A, the second lifting means 10B and the third lifting means 10C shown as examples.

In the respective examples described above the mounting portions 4 of the strip brush seals 2 are integrally joined by means of a bonding means such as soldering, electron beam or alternative welding method. The radial length of the retainer plate 15 will be sufficient if it is long enough to cover and hold the mounting portion 4 and to define a fixing portion 20. It, however, can be made to have a similar radial length to the back plate 6. In case that the retainer plate 15 has a similar radial length to the back plate 6, there should preferably dispose a clearance gap between the strip brush seal 2 and the retainer plate 15 such that the seal strips 3 can move along the circumference of the rotary shaft 60.

Although materials for the back plate 16 and the retainer plate 15 can be chosen as described above, the choice of a material should preferably be done in accordance with the thermal expansion ratio of the housing 50. For example, a nickel-based alloy or other non-ferrous metal may also be used. Furthermore the type and temperature of the process fluid in use and other conditions depending on its application domain will affect the selection process of materials.

In FIG. 1, the free end edge surface 15 fits the shaft 60 with a clearance gap of approximately 0.02 mm therebetween at the level shown by a solid line along the full circumference. Dotted line represents a range of excursions by the shaft 60. The strip brush seal 2 effects a seal at the seal portion 6 against the fluid. This strip brush seal device 1 disposes the seal strips 3 such that the direction of the width of the strip coincides with a direction of action of the fluid. This arrangement provides a substantial sustainability against the fluid pressure and the seal portion 6 exhibits an improved seal capability against a high pressure. Forces caused by excursions of the rotary shaft 60 are opposed by the elastic deformation of thin flexible strips, and since the seal portion 6 is formed at a second angle θ to the rotational direction of the rotary shaft the seal portion 6 is capable of preventing wear due to friction by means of resilient adaptation against excursions of the rotary shaft 60.

In addition since the inter strip gap in the free end side of the lifting strip of a seal portion 6 is arranged small a secure seal can be provided against fluid. Also the individual spacer portions 5 which are integrally joined effectively prevent the fluid from leaking through the mounting portion 4 in a radially outward direction. The mounting portions 4 can securely be connected with each other by means of welding at the both sides of the spacer portions 5.

Described below is an alternative embodiment related to the present invention.

In a strip brush seal device 1 of a second embodiment related to the present invention, the lifting portion is defined as a lifting strip and a lifting strip 3B retains a lifting means 10 at the free end of the lifting strip 3B.

In the strip brush seal device 1 of a second embodiment related to the present invention, as the notch-shaped lifting means 10 is disposed at the free end of the lifting strip 3B as shown in FIG. 12 a fluid entering the inter strip gap of a stoppage portion 3A continues to flow toward the free end tip of the lifting strip 3B and then flows through the lifting means 10 into an adjacent inter strip gap which is formed between the current seal strip 3 and adjacent seal strip 3 being located adjacently forward. The fluid pressure in this case acts on so as to lift the lifting strip 3B. Pressure distributions under this circumstance acts on in a uniform manner like $P_B$ of FIG. 13, FIG. 16 and FIG. 18.

Figure 18:
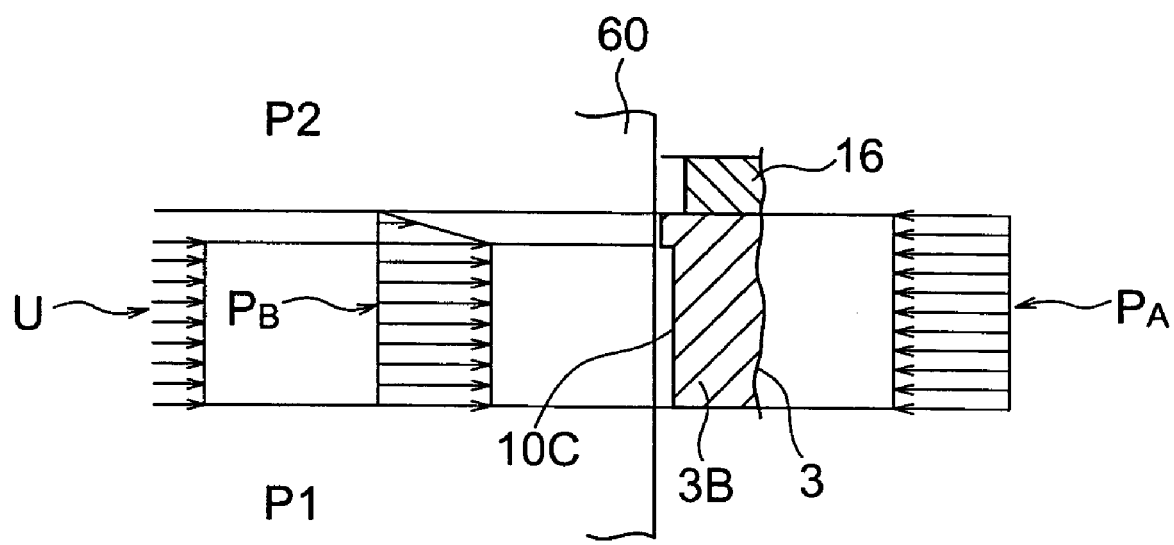
FIG. 18 shows a pressure distribution and lifting force distribution on the lifting strip of FIG. 17 when the fluid pressure acts on the lifting strip.

The lifting force distribution becomes of an equal amount of force anywhere as indicated by U of FIG. 13, FIG. 16 and FIG. 18. This enables the arranged surface of the lifting strip 3B to be kept at a minute gap and in parallel to the circumference of the rotary shaft 60. The gap maintained between the lifting strip 3B and the rotary shaft 60 tolerates excursions of the rotary shaft 60 and friction is effectively prevented. As a result the lifting strip 3B being lifted away from the circumference of the rotary shaft 60 is capable of preventing wear of the lifting strip 3B and the circumference of the rotary shaft 60. The seal capability of the seal portion 6 can also be improved by increasing a pressure in the inter strip gap of the lifting strip 3B by means of the lifting means 10.

A strip brush seal device 1 of a third embodiment related to the present invention retains a spacer portion for providing an inter strip gaps to a seal strip 3 in an outer circumferential mounting portion 4 and the free end surface of an inner circumferential lifting portion 3B is disposed in an abutting relation or in close proximity with a rotary shaft 60.

In the strip brush seal device 1 of a third embodiment related to the present invention, when the seal strips 3 are disposed around the rotary shaft 60 to form an annularly shape and the adjacent strip surfaces of the seal strips 3 located toward the seal portion 6 side lightly abut with each other or come in close proximity relative to each other, a mounting portion 4 side necessarily becomes large in diameter and a gap remains between the arranged surfaces. Choosing the height of the spacer portion 5 according to the remaining inter strip gap leads to a straightforward manufacture of the annularly shape of the mounting portions 4. Also welding of the spacer portions 5 of the mounting portion 4 along the side edge does not cause any deformation to the orderly arranged strip gap of the seal strips 3 and provides an easy means for integration. This welding process takes place at a distal location from the radially inward free end and therefore no influence on the elastic deformation of the lifting portion 3 is resulted.

Inter strip gap in the mounting portion 4 side of the seal portion 6 is made large and the radially inward surface of the lifting portion 3B lightly abut on the circumference of the rotary shaft 60 wherein a space of a triangular cross section is formed between the arranged surfaces of the seal portion 6. This makes the fluid flow more easily from the inter strip gap in the stoppage portion 3A side toward the inter strip gap in the radially inward lifting portion 3B. The fluid then passes through between the lifting portion 3B and the circumference of the rotary shaft 60 and lifts up the lifting portion 3B by a minute clearance gap. The lifting portion 3B is therefore put into a non-contact situation relative to the circumference of the rotary shaft 60 and friction and wear under a sliding motion is prevented. Also a pressure increase of the fluid in the inter strip gap of the lifting portion 3B leads to an improvement of the seal capability of the seal portion 6.

A strip brush seal device 1 of a fourth embodiment related to the present invention retains a seal strip 3 of a seal portion 6 being arranged gradually thinner as it approaches the free end tip thereof.

In the strip brush seal device 1 of the fourth embodiment related to the present invention, since the thickness of the seal strip 3 gradually decreases as it approaches the free end tip, the lifting portion 3B can exhibit a substantial elastic deformation and improve a lifting capability thereof. Also as the inter strip gap of the seal portion 6 can be arranged small an inhibition (seal) effect of the seal portion 6 against the fluid can be improved. In case of a strip brush seal 2 of a small diameter, in particular, a longitudinal length of the seal strip 3 becomes small. Gradually thinning the seal strip 3 in a direction toward the lifting portion 3B provides a substantial lifting capability of the lifting portion 3B even for the seal strip 3 of a short length. The lifting portion 3B thus provided with a resilient flexibility effectively prevents friction and wear against the rotary shaft 60.

A strip brush seal device 1 of a fifth embodiment related to the present invention retains a lifting portions 3B which is cut away in a notch shape in a direction of from a free end tip of a lifting portion 3B toward a mounting portion 4 side.

In the strip brush seal device 1 of a fifth embodiment related to the present invention, as the lifting portion 3B is cut away in a notch shape from the free end tip of the lifting portion 3B a fluid entering the inter strip gap of a stoppage means 3A passes through the lifting portion 3B and provides the lifting portion 3B with a continuous lifting force such that the lifting portion 3B is lifted away from the circumference of a rotary shaft 60 at a uniform distance thereto. The pressure distribution acts on in a uniform manner as shown in $P_B$ of FIG. 13.

The lifting force distribution becomes of an equal amount of force anywhere on the surface as indicated by U of FIG. 13. This enables the arranged surface of the lifting portion 3B to be kept at a minute gap and in parallel to the circumference of the rotary shaft 60. The gap maintained between the lifting portion 3B and the rotary shaft 60 tolerates excursions of the rotary shaft 60 and friction and wear are thus prevented. Also shaping of the lifting portion 3B to a square notch leads to a uniform distribution of the lifting force and being able to make a gap of the lifting portion 3B very small relative to the circumference of the rotary shaft 60. As a result, not only the friction is prevented but also the seal capability improves.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A strip brush seal device for effecting a seal between a rotary shaft and one component, the rotary shaft extending through said one component and being in a mating relation with and relatively rotating against said one component, said strip brush seal device comprising:
    a) a strip brush seal including a mounting portion and a seal portion, said mounting portion being disposed in an outer circumference of an annularly-shaped body, said annularly-shaped body being formed by arranging a plurality of thin rectangular seal strips along a circumference of said rotary shaft, said seal portion being located in a radially inward portion of said annularly-shaped body; and
    b) a back plate being disposed in an opposite side of said strip brush seal with respect to a fluid;
    wherein each said seal strip includes a stoppage portion and a lifting portion, said stoppage portion being disposed in a radially outward portion of said seal strip relative to said seal portion, said lifting portion constituting a radially inward portion of said seal strip, said stoppage portion being arranged at a first angle relative to a tangential direction of the circumference of said rotary shaft at a point corresponding to a free end tip of said seal strip, said lifting portion being arranged at a second angle to the tangential direction of the circumference of said rotary shaft at the point, said second angle being in the range of from 0 to 40 degrees, said first angle and said second angle being pre-formed with said seal strip before pressing against said shaft, and wherein said first angle is greater than said second angle.

2. A strip brush seal device as claimed in claim 1, wherein said lifting portion is defined as a lifting strip and the free end tip of said lifting strip includes a lifting means.

3. A strip brush seal device as claimed in claim 1, wherein spacer portions are disposed in order to provide a clearance gap between adjacent said seal strips in said mounting portion and the arranged surface at the free end of said lifting portions abuts with or comes in close proximity to said rotary shaft.

4. A strip brush seal device as claimed in claim 1, wherein said seal strip in said seal portion is arranged gradually thinner in a direction toward the free end tip of said seal strip.

5. A strip brush seal device as claimed in claim 1, wherein said lifting portion is defined as a rectangular notch which extends in a direction from said free end tip of said seal portion towards said mounting portion.

* * * * *